July 4, 1961 J. L. PHILLIPS 2,990,809
LIVESTOCK WATERING TANK
Filed April 27, 1959
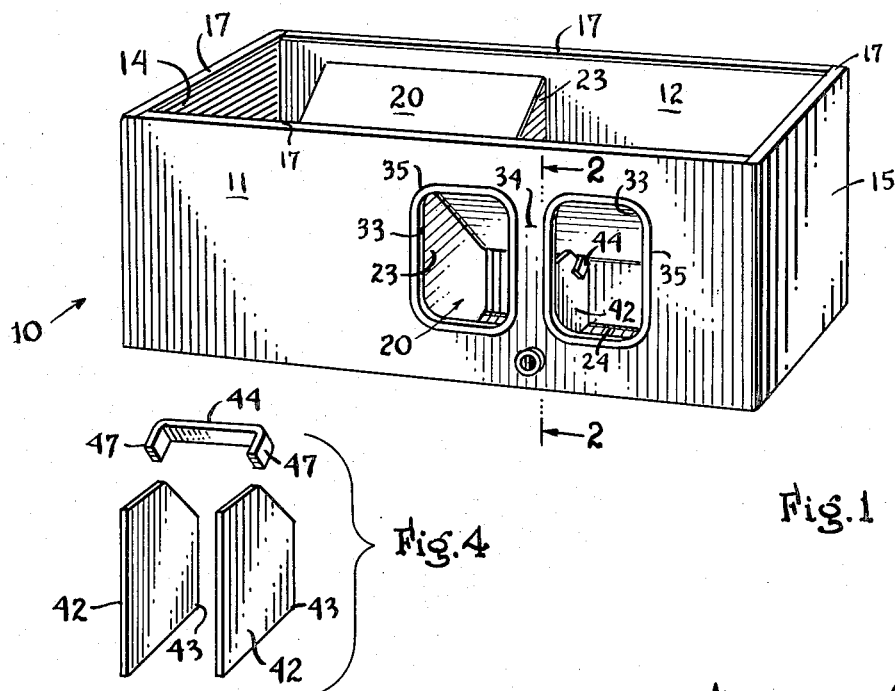
Fig.1
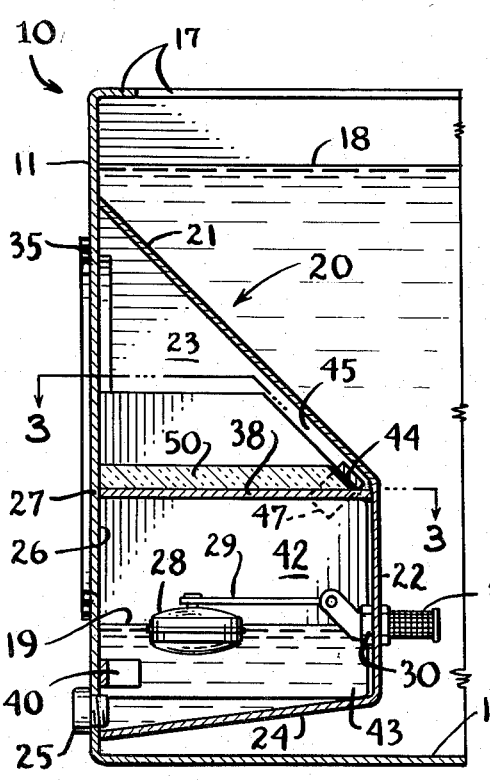
Fig.4
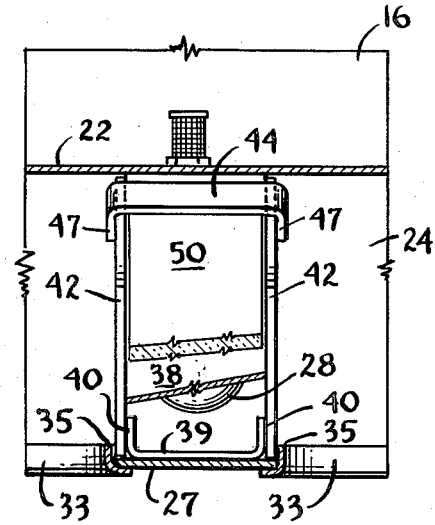
Fig.2
Fig.3
John L. Phillips
INVENTOR
BY United States Patent Office 2,990,809
Patented July 4, 1961

2,990,809
LIVESTOCK WATERING TANK
John L. Phillips, Kewanee, Ill., assignor to Advance Metalworking Company, Kewanee, Ill., a corporation of Illinois
Filed Apr. 27, 1959, Ser. No. 809,119
2 Claims. (Cl. 119—78)

The present invention relates broadly to improvements in watering tanks providing drinking water for domesticated animals such as cattle and hogs; and more particularly to a watering tank providing improved structure for dispensing water in low-level compartments that are readily accessible to hogs, or other small animals unable to drink from relatively high-level tanks such as now in common use.

The tank to be disclosed in detail below is more specifically designed to overcome several difficulties of presently available low-level watering tanks. By way of example, and not in a restricting sense, some of these difficulties are set forth briefly below.

Present tanks suffer frequent failure of the float valves that control low-level water due to different causes. One cause is direct damage by the hogs. Even though plates heretofore have been placed between the low-level trough and the float, the hogs have bent support rods or the like, or worked the plates off by "rooting." Even simple lock devices have been opened by hogs, and the float damaged. Another frequent cause of float valve malfunctioning is the accumulation of debris in the float chamber. Still another common failure to operate is due to formation of ice on the surface of the water in the float-valve chamber.

Another annoyance, particularly when large and relatively strong hogs use watering tanks, is actual injury to both the hogs and the tank due to the instinctive struggling of two or more hogs for access to the water in a single watering port. With many present tanks the septum between the ports comprises a weak structural point. A large hog can bend or even break this septum to cause same to present cutting edges.

Accordingly it is a broad object of this invention to provide an improved livestock watering tank.

Another object, in keeping with the first object, is to provide a latch that cannot be opened by a single hog by its instinctive rooting actions.

Another object, in keeping with the first object, is to provide a tank in which the float chamber is the last chamber or compartment in which ice will ordinarily tend to form.

Another object, in keeping with the second object, is to provide readily removable and replaceable chamber forming plates to facilitate cleaning of the tank.

A still further object is to provide a livestock watering tank in which reinforcing structural parts provide dual functions in framing a float chamber and strengthening tank portions adjacent watering ports or holes.

Other objects and advantages reside in the combination of features recited in the above objects, as well as in the details of construction, and will be either obvious or pointed out in the following specification and claims.

In the drawing:

FIG. 1 is a perspective view of a livestock watering tank comprising two dual watering units;

FIG. 2 is a sectional view taken substantially on line 2—2 of FIG. 1;

FIG. 3 is a partial sectional view taken substantially on line 3—3 of FIG. 2; and, FIG. 4 is an exploded detail perspective view of three removable parts of the invention.

Referring now in detail to the drawing, a generally rectangular tank 10 has identical front and rear walls 11 and 12, identical end walls 14 and 15, and a bottom 16; all being suitable secured together water-tight as by welding, for example. All parts are preferably of corrosion resistant materials, or painted, or otherwise protected from the elements and rusting. The walls are flanged at 17 preferably to strengthen the top of the tank and provide a splash-guard or lip. The tank thus formed by the walls and bottom normally contain a relatively high-level of water 18 accessible to cows, horses and other large livestock.

To water hogs, sheep, and other small animals, or poultry, a low-level of water 19 is maintained. These are conveniently formed in this invention with pairs of openings or ports to be described more in detail below. Low level housings 20 are preferably identical and have a sloped top wall 21, a vertical back wall 22, vertical end walls 23 (only one of which is shown) and a bottom 24 sloped towards a clean-out bung 25. The top 21, bottom 24, and end walls 23 have front edges lying substantially in a plane and are preferably welded all around to the inside surface of the front and/or rear walls 11 and 12 to form water-tight low-level compartments.

The water level 19 is controlled by a float 28 carried by an arm 29 that controls a valve 30 having a screened inlet 31. When the water level 19 falls the valve 30 is opened and water will flow into the chamber 20. Each chamber 20 can be supplied with a float valve, or different chambers can be connected by pipes (not shown) if desired. It is to be noted that pipe interconnections, although adding to the cost, will cause more frequent functioning of the float, due to supplying more livestock through a single valve, and thus delay freeze up of water in the float chamber.

Hogs can place their heads in openings or ports 33 to obtain water 19. These ports 33 are sized conveniently to receive the head of the largest hog. However the septum 34 between the ports is kept at minimum practicable width because of structure now to be described. An edge-bent angle iron 35 frames each port 33. These angle irons are rounded at the corners and welded to the wall 11 (FIGS. 2 and 3) and the inner legs of the angle iron extend into the chamber 20 to form a splash-guard for the water 19 and also functions as part of a latch structure to be described below.

A generally horizontal stay plate 38 is secured to the inner wall of the septum 34 and the back 22 of the low level housing 20. A U-shaped bracket 39 is secured to the tank wall 11 below the stay plate 38. The outside surfaces of legs 40 of the bracket 39 are substantially the same width as the plate 38. Removable side plates 42 fit between legs 40 and the legs of the angle iron frame 35 to form latch points together with the side-front edges of the stay plate 38 to secure the side plates 42 in position. The lower right-hand corner 43 of side plates 42 engage the bottom 24 of the chamber 20. A U-shaped locking piece 44 straddles the upper-rear edges of plates 42, and is moved down a space 45 until the bottom of the piece 44 rests on the top of the stay plate 38.

With the side plates 42 locked in position it is found that even the largest hogs cannot damage the septum 34 because of the strength of the assembly in resisting forces in all directions. Accordingly, in keeping with the above structure, lighter gauge metal and hence less expensive tanks can be utilized than could be with previously known structure. Also, no single hog can remove the locking piece 44. If they try to "root" up one end 47 of the piece 44 it will bind and become immovable.

To clean debris out of housing 20 and check the float valve, etc. the side plates 42 are removed in the following manner. The left and right hands of the operator are inserted through left and right hand ports 33 respectively. The left hand fingers grasp the left hand leg 47 of the locking piece 44 and the right hand fingers grasp the right hand leg 47. Both hands are drawn up adjacent the space 45 (FIG. 2) until the legs 47 clear the side plates 42. The side plates are then grasped at their top edges and rotated around legs of the angle irons 35 until they clear the rear wall 22 of the housing 20. The plates 42 are sized to be conveniently removed and replaced through the ports 33 and are shaped so they can only be installed in the correct way.

In order to delay freezing up of the water 19 in the chamber containing the float 28 and valve 30, the stay plate 38 can conveniently support a block 50, or the like, of insulating material. It has been found with only a nominal amount of insulating material 50 so applied that the chamber enclosing the float will freeze up last, that is, after ice forms on the surface 18 and the more exposed portions of the surface 19. Thus short term freezes and thaws will not affect the present device as such conditions now affect prior devices.

It will be recognized from the foregoing that this invention presents several advantageous features. Obviously other features will occur to those skilled in the art. Hence I wish to be limited in my invention only by the scope of the following claims.

I claim:
1. A livestock watering tank comprising walls defining a tank for retaining a supply of water; at least one of said walls having a pair of openings separated by a septum; a partition joined to said one wall entirely around both of said openings to form a water-tight housing to contain water at a relatively lower level than said supply of water; a substantially horizontal stay plate attached to and extending between said septum and said partition; a pair of removable side plates adjacent said septum, said stay plate, and said partition to form a pair of watering chambers and an intermediate chamber; a latch piece in contact with and embracing said side plates for retaining same in position; and a float valve within said intermediate chamber for maintaining said lower level of water.

2. A livestock watering tank comprising walls defining a tank for retaining a supply of water; at least one of said walls having a pair of openings separated by a septum; a partition joined to said one wall entirely around both of said openings to form a water-tight housing to contain water at a relatively lower level than said supply of water; a substantially horizontal stay plate within said housing attached to and extending between said septum and said partition; a pair of removable side plates adjacent said septum, said stay plate, and said partition to form a pair of watering chambers and an intermediate chamber; a latch piece in contact with and embracing said side plates for retaining same in position; a float valve within said intermediate chamber for maintaining said lower level of water; and a frame around said openings for strengthening said one wall and said septum, said frame having legs extending through said openings for contacting and retaining said side plates at points spaced from the points of contact of said latch piece upon said side plates.

References Cited in the file of this patent

UNITED STATES PATENTS

| | | |
|---|---|---|
| 2,256,751 | Roe | Sept. 23, 1941 |
| 2,492,604 | Townsend | Dec. 27, 1949 |
| 2,614,532 | Steel | Oct. 21, 1952 |
| 2,635,580 | Donahoe et al. | Apr. 21, 1953 |
| 2,860,601 | Stein | Nov. 18, 1958 |